United States Patent
Haldenwanger et al.

(10) Patent No.: US 6,321,581 B1
(45) Date of Patent: *Nov. 27, 2001

(54) PROCESS FOR INCREASING THE WALL THICKNESS IN HOLLOW SECTIONS

(75) Inventors: Hans-Günther Haldenwanger, Ingolstadt; Jurgen Oswald, Magdeburg; Frank Fischer, Crimmitschau; Holger Wenzel, Weissenfels, all of (DE)

(73) Assignee: Audi AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/171,227
(22) PCT Filed: Mar. 14, 1997
(86) PCT No.: PCT/EP97/01299
  § 371 Date: Jan. 21, 1999
  § 102(e) Date: Jan. 21, 1999
(87) PCT Pub. No.: WO97/38807
  PCT Pub. Date: Oct. 23, 1997

(30) Foreign Application Priority Data

Apr. 13, 1996 (DE) ............................................. 196 14 656

(51) Int. Cl.$^7$ ............................. B21C 37/30; B23P 25/00
(52) U.S. Cl. ................... 72/57; 72/41; 72/342.94; 72/370.15; 29/421.1; 29/527.2
(58) Field of Search .................... 72/57, 58, 370.15, 72/342.1, 342.94, 41, 46; 29/421.1, 527.2

(56) References Cited

U.S. PATENT DOCUMENTS

| 2,313,116 | * | 3/1943 | Babcock . | |
| 3,950,975 | * | 4/1976 | Izumi et al. | 72/46 |
| 5,956,988 | * | 9/1999 | Beste et al. | 72/57 |

FOREIGN PATENT DOCUMENTS

| 0502773 | * | 8/1952 | (BE) | 72/57 |
| 291212 | * | 4/1916 | (DE) | 72/57 |
| 0144210 | * | 2/1989 | (JP) | 72/342.1 |
| 61253133 | * | 11/1986 | (JP) | 72/58 |
| 0245940 | * | 10/1989 | (JP) | 72/58 |

* cited by examiner

Primary Examiner—S. Thomas Hughes
Assistant Examiner—Eric Compton
(74) Attorney, Agent, or Firm—Lalos & Keegan

(57) ABSTRACT

The invention relates to a process for producing a region of greater wall thickness in a longitudinal hollow section (1) which, to this end, is subjected to a radial and axial pressure and plastically deformed thereby. The hollow section (1) is secured in a matrix (2) corresponding to the section dimensions which has an enlarged cross section corresponding to the intended final dimensions of the hollow section (1) in the deformation region. The essential embodiment consists in that the deformation to attain an increased wall thickness (14) takes place in a region between the ends of the section. In addition, the wall thickness (19) can be increased at at least one of the ends of the section.

15 Claims, 2 Drawing Sheets

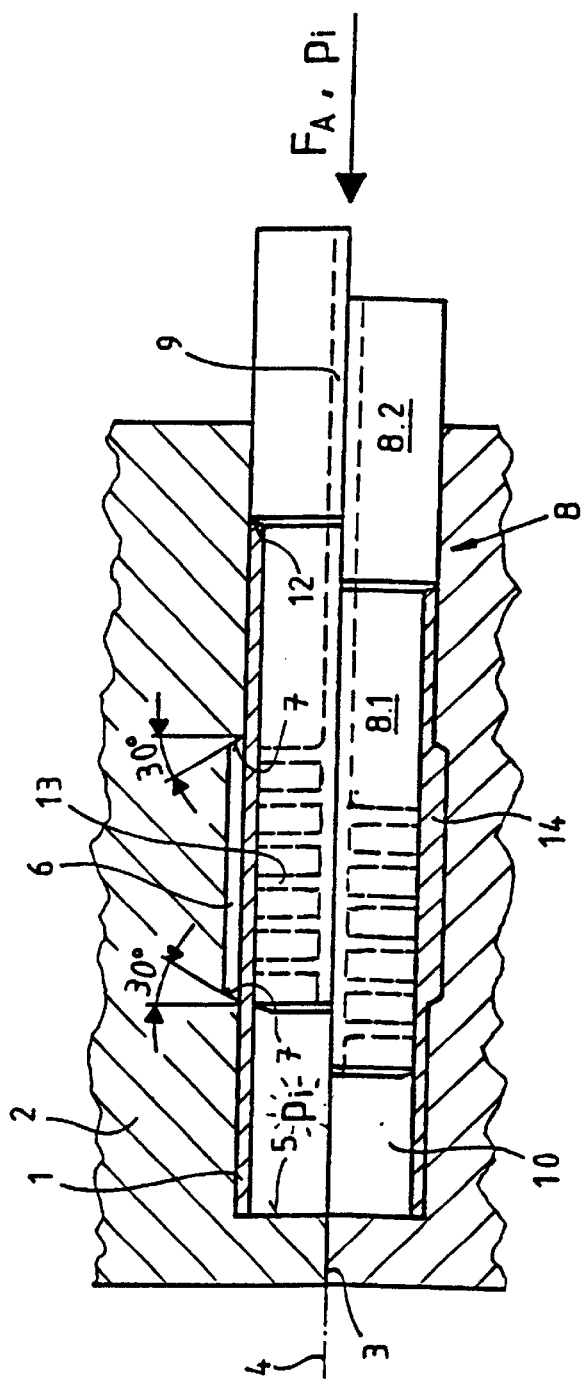
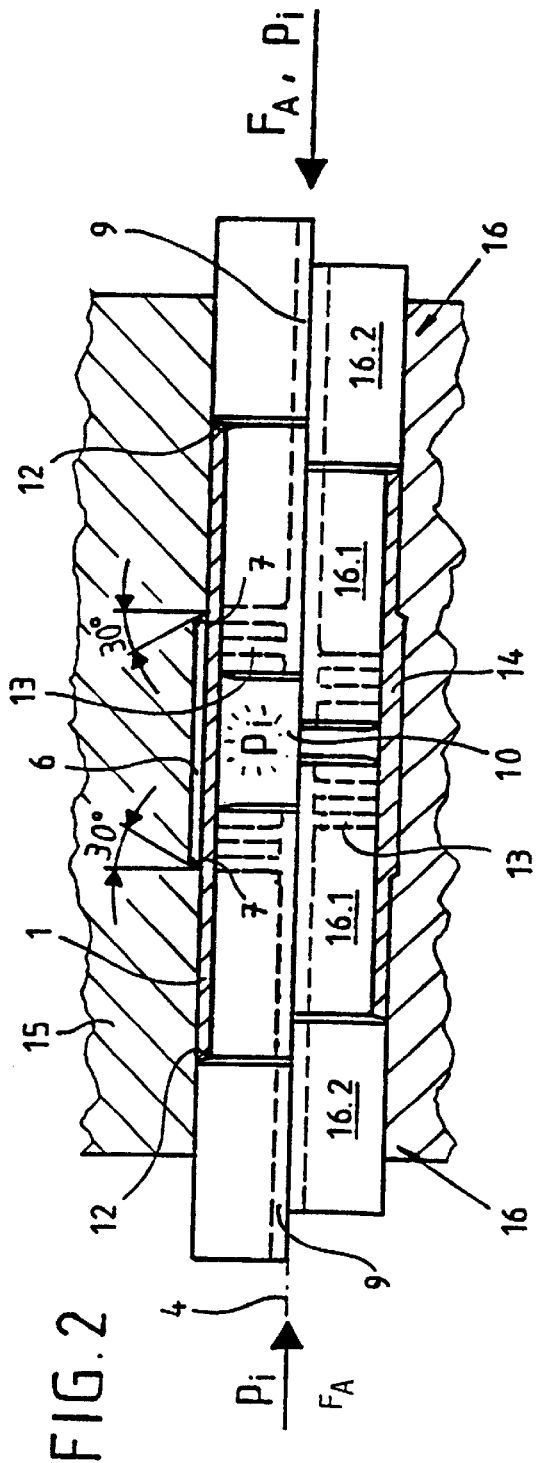

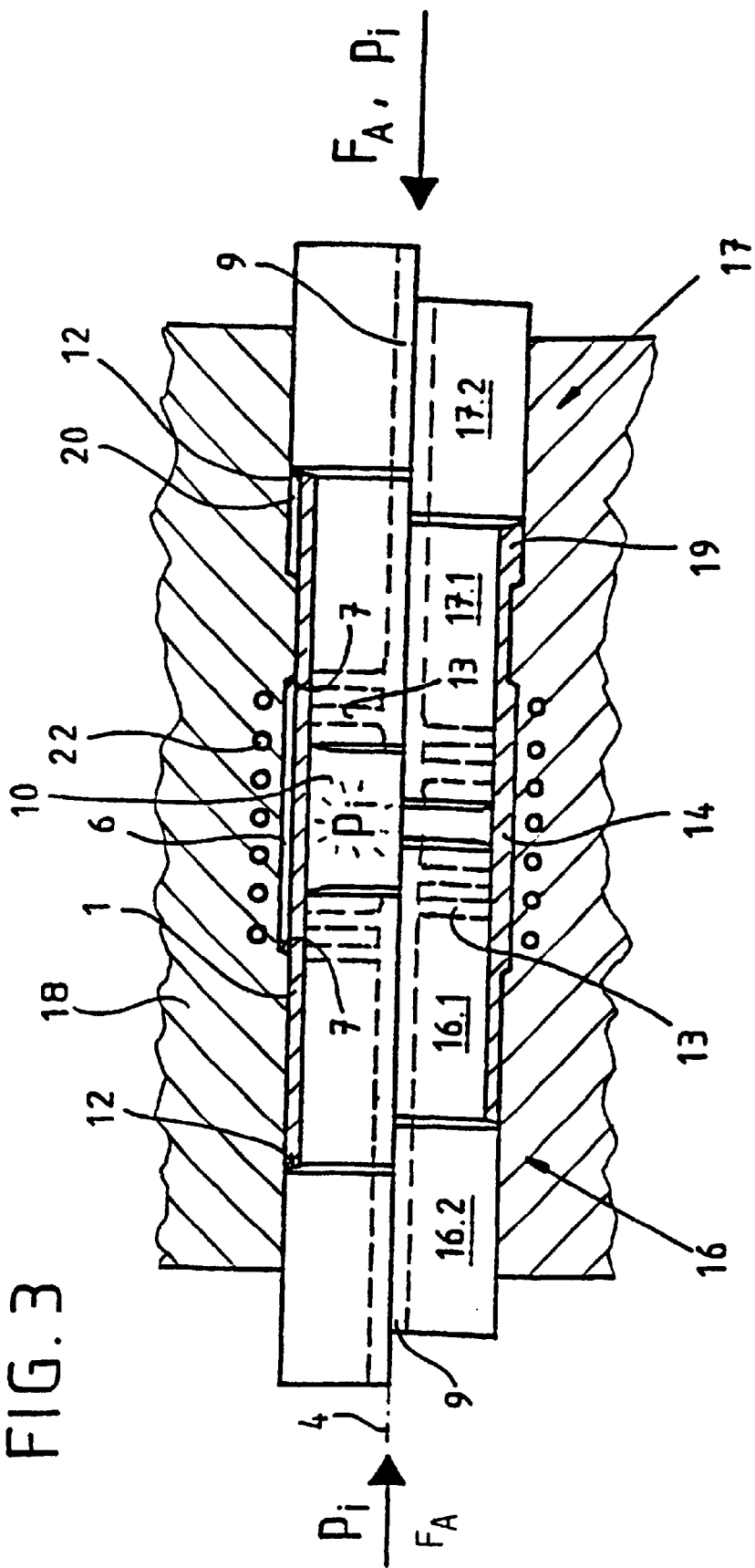

PROCESS FOR INCREASING THE WALL THICKNESS IN HOLLOW SECTIONS

The invention relates to a process for production of an area of increased wall thickness in a longitudinal section and to a device for application of the process.

A process such as this for production of increased wall thickness has been disclosed in SU-A-1417954, FIG. 1. In the process a longitudinal hollow section is secured in a die matching the external dimensions of the die, is subjected to axial pressure by an axial piston applying pressure on both sides, and in addition the profile cavity is subjected to radial pressure by a suitable medium. A hollow section is produced as a result, one which undergoes reduction of the internal cross-section over the entire length so that increased wall thickness is obtained.

German patent application 44 37 395 A1 describes a process for shaping a pipe end in which the pipe to be shaped is subjected to internal and external axial pressure, the pipe being secured in a die corresponding to the exterior dimensions of the pipe, and in the end area of the pipe to be shaped the die also being provided with a shape matching the final dimensions of the pipe after the shaping process and the pipe being subjected in the area to be shaped to end pressure by at least one axial piston and at the same time to radial pressure by a fluid.

The practice of shaping hollow sections by axial pressure and by radial pressure applied simultaneously by means of a fluid is known under the designation "internal high pressure shaping" (see DE-A 29 35 086, EP 0 484 789 B1). Such a process does not involve increase in the wall thickness in the hollow section shaped; what results is rather reduction in the thickness of the remaining wall by extension of the material. A process for upsetting section ends by plastic deformation by means of a stepped axial piston is disclosed in U.S. Pat. No. 5,203,194. Introduction of additional radial pressure by means of a fluid is not provided in this process.

Patent application DE 44 37 395 A1 is concerned primarily with plastic deformation of pipe ends for the manufacture of optimized-mass and long-lived exhaust systems for internal combustion engines. Areas of such subassemblies with cross-sectional dimensions modified on the basis of function serve the purpose, for example, of fastening special machine elements or subassemblies. Such subassemblies and machine elements may be represented, among other things, by sound absorbers, catalysts, or fitting flanges.

The object of Patent Application DE 44 37 395 A1 is development of a process for upsetting pipe ends and a device for application of the process by means of which a tubular element having generally optimum cross-sectional dimensions may be provided with end sections having larger cross-sectional dimensions so that the internal diameter remains unchanged, virtually free of a transitional area, even in the area of the pipe end, and yet the cross-sectional dimensions required remain available for the joining of additional components, by welding for example.

The object of the invention is to increase the shaping options of the state-of-the-art process as described in the preamble of Claim 1 in order to produce an area of increased wall thickness in an oblong hollow section. Modification of the internal cross-section of the hollow section is not to take place in the process.

The solution claimed for the invention is to be seen from the descriptive portion of Claim 1 and is based on a procedure as specified in the preamble of Claim 1.

By application of this process more or less minor tool modifications need be made to provide any given area between section ends with increased wall thickness rather than the entire length of a hollow section, the internal cross-section remaining the same. The hollow section itself may be of any desired cross-sectional shape (e.g., rectangular, as specified in U.S. Pat. No. 5,203,194, round, polygonal, open or closed, etc). The only requirement for this purpose is that dies or axial pistons have the same shape.

In addition, the hollow section may consist both of a metallic and a nonmetallic material (such as a plastic).

The areas situated between the ends of a section and also the section ends may be upset and provided with increased wall thickness in the concomitant plastic deformation.

The invention is described in what follows with reference to exemplary embodiments, and with supplementary reference made to the explanations presented in Patent Application DE 44 37 395 A1. The accompanying drawing shows in FIG. 1 a device into which a hollow section to be shaped has been introduced, with an axial piston in an initial and final position, in FIG. 2 a modified device with two axial pistons mounted opposite each other in initial and final positions, and in FIG. 3 an additionally modified device, in this instance as well with two axial pistons mounted opposite each other and two hollow section areas to be deformed.

FIG. 1 shows a hollow section 1, such as a steel pipe, introduced into a divided hollow die 2 whose parting plane 3 extends orthogonally to the plane of the drawing intersecting with the longitudinal axis of the hollow section 1. The hollow section 1 extends into the cavity 10 of the hollow die 2 until the face of the section rests on the bottom 5.

Approximately in the central area of the hollow section 1 the divided hollow die 2 has a circumferential cross-sectional extension, so that a gap 6 is formed between the outer wall of the hollow section 1 and the interior diameter of the hollow die 2, which is extended in this area. The transition from the smaller to the larger diameter is in the form of a retaining edge 7 positioned at an angle of approximately 30° to the perpendicular to the longitudinal axis 4.

The tool set also includes an axial piston 8 which is provided with a through axial bore 9 for a fluid. Water, preferably water with synthetic additives, for example, is suitable as pressurized fluid.

The shaped axial piston 8 consists of a front piston component 8.1 which is to be introduced into the hollow section 1 and is suitably adapted in the shaping process, adjoining which component is a rear piston component 8.2 adapted to the dimensions of the cavity 10. The transition from the smaller to the larger cross-section of the axial piston 8 is designed as a sealing shoulder whose plane of section inclines slightly (for example, at an angle of 15°) to the perpendicular to the longitudinal axis 4 of the axial piston 8.

In the area of the gap 6 in the hollow die 2 the axial piston 8 has a number (six, for example) of rows of radially arranged bores 13 which extend from the axial bore 9 to the peripheral surface of the axial piston 8. Each row of bores is situated in a plane perpendicular to the plane of the drawing and consists of a number (six, for example) of uniformly spaced individual bores (which incline, for example, at an angle of 60°).

After the sealing shoulder 12 of the axial piston 8 comes to rest against the face of the hollow section 1 (the end of the front piston component 8.1 is situated more or less in the area of the front retaining edge 7 of the gap 6), the piston is first subjected to an axial force $F_A$ (5 kN, for example). Fluid is then pumped through the axial bore 9 through the axial piston 8 and subsequently subjected to a certain pressure (for example, 0.5 MPa). In this situation there is formed between the face of the axial piston 8 and the bottom of the hollow die 2 a forced seating area (cavity 10) in which the hollow section 1 resting against the wall of the die is supported against buckling. In addition, the fluid is applied by way of the radial bores 9 to the area of the hollow section 1 to be upset. With increase in the axial force $F_A$ applied to the axial piston 8 (e.g., to a value exceeding 100 kN), accompanied by simultaneous increase in the internal pressure $P_i$ of the fluid (e.g., to at least 15 MPa), plastic deformation of the hollow section 1 takes place in the area to be shaped to the point of complete filling of the gap 6. The interior cross-section of the wall-thickened area 14 of the hollow section 1 (cf. the lower part of FIG. 1) remains unchanged, but the wall of this area is thickened, for example, by three millimeters.

After the deformation process has been completed, the axial piston is removed from the divided hollow die 2 and the pressure of the fluid is simultaneously removed. After the sections of the die have been separated the shaped hollow section 1 may be removed and then if necessary undergo additional working (such as bending, joining to other components, etc.).

Consequently, in the process claimed for the invention an upsetting process is applied to thicken the wall of a hollow section 1 in a particular area. Application of a tangential load to the wall of the hollow section also takes place in the course of the extension process introduced as a result of the radial load applied by the fluid, and at the same as a result of axial load application by the force of the axial piston 8. The resulting multidimensional load application overcomes the resistance to elastic deformation to a specific extent and leads to the plastic deformation desired.

It is useful for the axial force $F_A$ to increase, together with the interior pressure $P_i$, as a function of the open cross-sectional area $A_R$, in accordance with the statement $$F_A = 1.1 \times A_R \times P_i.$$

This ensures among other things that in no circumstances will the section wall buckle on one side in the forced seating area as a result of increase in the axial forces on one side. At the same time it ensures sealing by the sealing shoulder 12 and the face of the hollow section 1.

The face of the hollow section 1 forming a sealing pair with the sealing shoulder 12 of the axial piston 8 is produced as a surface ensuring sealing and axial loading capacity by metal removing, cold working, mechanical, or thermal separation processes.

It is conceivable that the radial bores 9 could if necessary be dispensed with, inasmuch as the existing dimensioning tolerance between the front part of the piston 8.1 and the interior wall of the hollow section 1, along with the concomitant specific escape of pressure buildup by the fluid, and accordingly the radial load application to the hollow section 1 in the area of the gap 6, is already ensured.

FIG. 2 illustrates a modified embodiment of the tool employed to increase the wall thickness in the central area of the hollow section 1. For the most part reference may be made to the preceding comments regarding the exemplary embodiment shown in FIG. 1, for which reason the same reference numbers are used in the appropriate places in subsequent discussion.

In this exemplary embodiment as well use is made of a divided die 15 whose plane of separation extends along the longitudinal axis 4. Unlike the exemplary embodiment shown in FIG. 1, two axial pistons 16 are used here, each consisting of a front piston element 16.1 and a rear piston element 16.2. During shaping, that is, the upsetting process carried out to fill the gap 16 with the material of the hollow section 1, the two axial pistons 16 may be moved toward each other (under the action of force $F_A$), the pressure of a fluid $P_i$ being applied at the same time. It is also conceivable, however, that only one of the two axial pistons 16 will move, while the other serves exclusively to seal the system (sealing shoulder 12) and to support the material of the hollow section in the area of the retaining edge 7.

The exemplary embodiment illustrated in FIG. 3 also involves operation with two axial pistons 16, 17, which move in a divided die 18 in this instance as well. In contrast to the exemplary embodiment shown in FIG. 2, not only is a wall-thickened area 14 now produced between the ends (that is, in the central area, for example) of the hollow section 1, but a wall-thickened area 19 is additionally formed at one of the two ends of the section (the right one). This wall-thickened area could, of course, be formed at the opposite end of the section, or even at both ends.

The divided die 18 is for this purpose provided in the area of the section end in question with a corresponding cross-sectional extension, with the result of creation of another gap 20 which later, after deformation, is filled with the material of the hollow section 1.

In order that initially the gap 6 and only then the gap 20 will be filled with the material of the hollow section 1 (the inverse sequence is conceivable) during movement of the two axial pistons 16, 17 (or even the movement of only one of the two pistons) in the context of the extrusion process, it is useful to treat the material of the hollow section 1 in the area of the gap 6 selectively so that it ultimately becomes more "deformation compliant" than is the case in the area of the gap 20. This can be accomplished, for example, by applying friction-reducing coatings to the tool (die 18 and/or axial piston 16, 17) and/or to the hollow section 1. This effect can also be achieved, for example, by local heating (through heating ducts 22 mounted in the divided die 18, extending over the length of the gap 6, and enclosing the hollow section 1. In temperature control account must of course be taken of the boiling point of the fluid (water, for example), so that this measure is of limited effectiveness, especially if the hollow section 1 is made of a metallic material. Another option would be to provide the hollow section 1 in the area of the gap 6 in advance with a somewhat smaller wall thickness or to anneal it (in the case of a metal hollow section), and so render it more "deformation compliant" than is the case in the area of the gap 20, that is, at the end of the profile also to be shaped. Such measures could also prove to be useful if increased wall thickness is to be imparted to at least two areas of the hollow section 1 situated between the ends of the section and no increase in wall thickness has been provided at the end of the section itself.

What is claimed is:

1. A process for reshaping the exterior profile of a workpiece having a longitudinal bore therethrough, comprising:

providing a die having a cavity with a wall conforming to said exterior profile of said workpiece and at least one enlarged section disposed between and spaced from ends of said cavity and cooperable with the remaining portion of said cavity wall to provide a selected exterior profile of said workpiece;

inserting said workpiece into said cavity;

inserting at least one ram member into said cavity, having a first section provided with an external profile conforming to the interior profile of said workpiece receivable within an end of said workpiece, a second section provided with an external profile conforming to said exterior profile of said workpiece, a shoulder disposed between said first and second sections engageable with an end of said workpiece, and a fluid passageway interconnecting an inlet port and at least one outlet port disposed on said first section, registrable with said enlarged section of said cavity wall when said ram member is inserted into said cavity with said first section thereof inserted into said workpiece and said shoulder engages said end of said workpiece; and simultaneously applying a longitudinal force on said ram member and a fluid under pressure to said passageway, causing said workpiece to deform and thus flow into said enlarged section of said cavity wall to form said selected exterior profile of said workpiece while maintaining said interior profile thereof.

2. The process according to claim 1 including heating said workpiece to enhance its flowability.

3. The process according to claim 1 wherein said enlarged section of said cavity wall is positioned so that the enlarged wall section of said workpiece formed lies between the ends of said workpiece.

4. The process according to claim 1 including applying a lubricant to the exterior surface of said workpiece.

5. The process of claim 1 including providing at least a second enlarged section of said cavity wall disposed between the ends of said first ram section when said first ram section is inserted into said workpiece and said shoulder engages said end of said workpiece.

6. The process of claim 1 wherein said workpiece is tubular and said enlarged section of said cavity is annular.

7. The process according to claim 6 wherein said passageway includes an axially disposed section and at least one radially disposed section communicating with said outlet port.

8. The process according to claim 1 wherein said die cavity has an open end and a closed end and wherein said passageway of said ram member communicates with a second outlet port communicating with a chamber defined by a portion of said workpiece, an end wall of said cavity and an end wall of said ram member when said workpiece is inserted in said cavity and said first section of said ram member is inserted in said workpiece.

9. The process according to claim 1 wherein said die cavity includes two open ends and including inserting the first sections of two of said ram members through said open ends with the shoulders of said ram members engaging ends of said workpiece.

10. An apparatus for reshaping the exterior profile of a workpiece having a longitudinal bore therethrough, comprising:

a die having a cavity with a wall conforming to said exterior profile of said workpiece and at least one enlarged section disposed between and spaced from ends of said cavity and cooperable with the remaining portion of said cavity wall to provide a selected exterior of said workpiece;

at least one ram member insertable into said cavity, having a first section provided with an exterior profile conforming to the interior profile of said workpiece, insertable into said bore of said workpiece, a second section provided with an exterior profile conforming to said exterior profile of said workpiece, a shoulder disposed between said first and second ram sections and a fluid passageway having an inlet port communicable with a source of fluid under pressure and at least one outlet port registrable with said enlarged section of said cavity wall when said workpiece is inserted into said cavity and said ram member is inserted in said cavity with said first ram section received in said workpiece and said shoulder of said ram member engages an end of said workpiece; and means for applying a longitudinally directed force on said ram member whereby upon said workpiece being inserted in said cavity, said ram member being inserted into said cavity with said first ram section being inserted into said workpiece and said shoulder of said ram member engaging an end of said workpiece, and fluid under pressure being applied to said passageway, said workpiece shall be caused to deform with a portion thereof flowing into said enlarged section of said cavity wall to provide said selected exterior profile of said workpiece.

11. An apparatus according to claim 10 including means for heating at least a portion of said workpiece when disposed within said cavity.

12. An apparatus according to claim 10 wherein said ram sections are cylindrical and said enlarged section is annular.

13. An apparatus according to claim 10 wherein said cavity includes an open end and a closed end, and said first ram section includes a second outlet port intercommunicating said passageway and a chamber defined by an end wall of said cavity, a portion of the interior wall of said workpiece and an end wall of said first ram section when said workpiece and ram member are inserted in said cavity.

14. An apparatus according to claim 10 wherein said cavity includes two openings, and including two ram members each insertable through one of said cavity openings.

15. An apparatus according to claim 10 wherein said die is formed of two sections mated together along a plane passing through a longitudinal center line thereof.

* * * * *